J. H. MATHESON.
MANUFACTURE OF LAPWELDED TUBES.
APPLICATION FILED MAR. 30, 1920.

1,367,412.

Patented Feb. 1, 1921.
2 SHEETS—SHEET 2.

Inventor—
James H. Matheson,
by his Attorneys.

UNITED STATES PATENT OFFICE.

JAMES H. MATHESON, OF READING, PENNSYLVANIA.

MANUFACTURE OF LAPWELDED TUBES.

1,367,412.  Specification of Letters Patent.  Patented Feb. 1, 1921.

Application filed March 30, 1920. Serial No. 369,858.

*To all whom it may concern:*

Be it known that I, JAMES H. MATHESON, a citizen of the United States, residing in Reading, Pennsylvania, have invented certain Improvements in the Manufacture of Lapwelded Tubes, of which the following is a specification.

My invention relates to certain improvements in the manufacture of high grade lap welded tubes, which are subjected to a second run through a furnace and welding apparatus to insure a more uniform product than results from the ordinary single run process.

One object of my invention is to simplify and cheapen the present method of manufacturing tubes and to increase the production.

A further object of my invention is to provide an improved means for handling the tubes during the process of manufacture.

Figure 1:
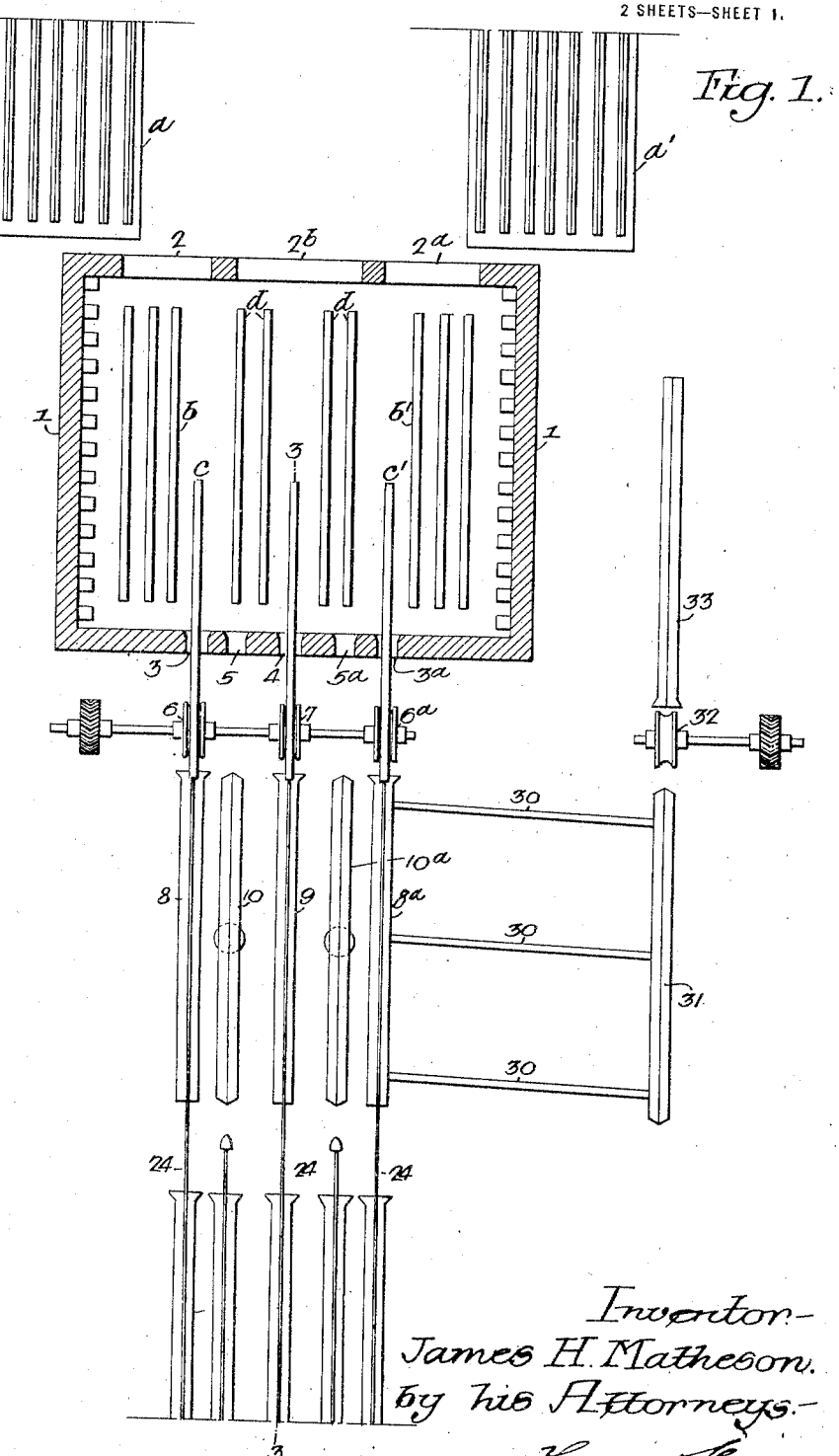
Figure 1 is a diagrammatic plan view showing the furnace in section and illustrating my improved apparatus for the manufacture of lap welded tubes.
Figure 2:
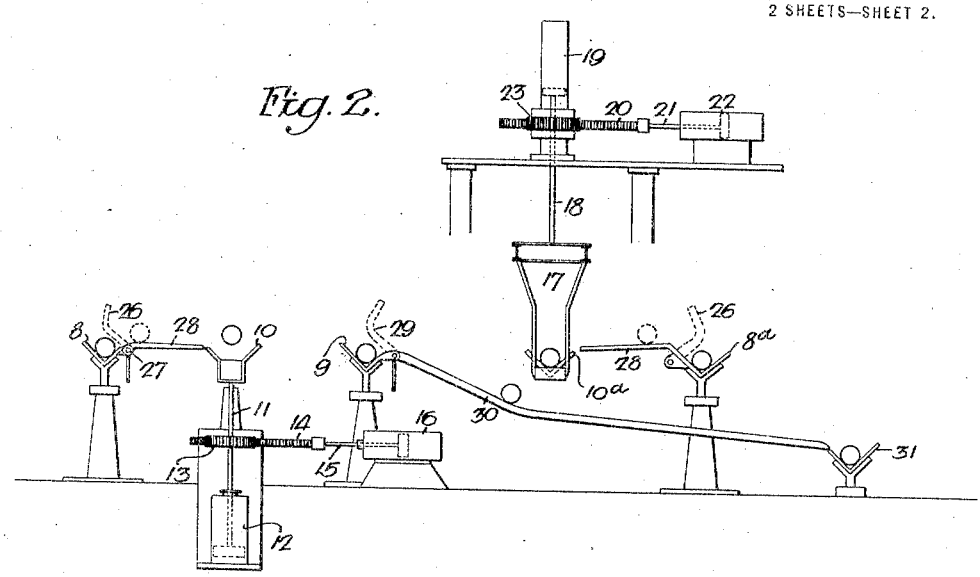
Fig. 2 is a diagrammatic end view.

1 represents the furnace, which may be of the usual regenerative type. 2, $2^a$ are the charging openings at one end of the furnace and 3, $3^a$ and 4 are the withdrawal openings at the opposite end of the furnace. Between the withdrawal openings 3 and 4 is a recharging opening 5 and between the withdrawal openings $3^a$ and 4 is a recharging opening $5^a$. In the present instance, these recharging openings 5 and $5^a$ are located nearer their respective withdrawal openings 3, $3^a$ than the central withdrawal opening $4^a$. In line with each of the withdrawal openings 3, $3^a$ and 4 are the welding rolls 6, $6^a$ and 7 of the ordinary type and driven in any suitable manner. Beyond these welding rolls are troughs 8, $8^a$ and 9 respectively, which receive the tubes after they pass between the welding rolls.

In line with the recharging openings 5, $5^a$ are the charging troughs 10, $10^a$, which receive the tubes from the troughs 8, $8^a$ respectively. The charging troughs can be turned on pivots so as to be reversed in order to permit the turning of a tube, end for end, after passing between the first welding rolls, to reënter the furnace in the reversed position. The charging trough, 10, in the present instance, is mounted on a plunger 11 having a piston adapted to a hydraulic cylinder 12 so that it can be raised clear of the other troughs and turned. The plunger 11 passes through a gear wheel 13 having teeth which mesh with the teeth of the rack 14 connected to a piston 15 of a cylinder 16. By this arrangement, the trough can be raised and turned end for end and lowered to a position in line with the charging opening 5. The other trough $10^a$ is carried by an overhead frame 17, in the present instance, suspended from a piston rod 18 having a piston adapted to a cylinder 19 which is turned by a rack 20 pivoted to a piston rod 21 adapted to a cylinder 22. The rack meshes with a gear wheel 23 through which the piston rod 18 extends.

While I have shown one method of carrying the troughs 10 and $10^a$, and turning them on their pivots, other means may be provided without departing from the essential features of the invention.

Figure 3:
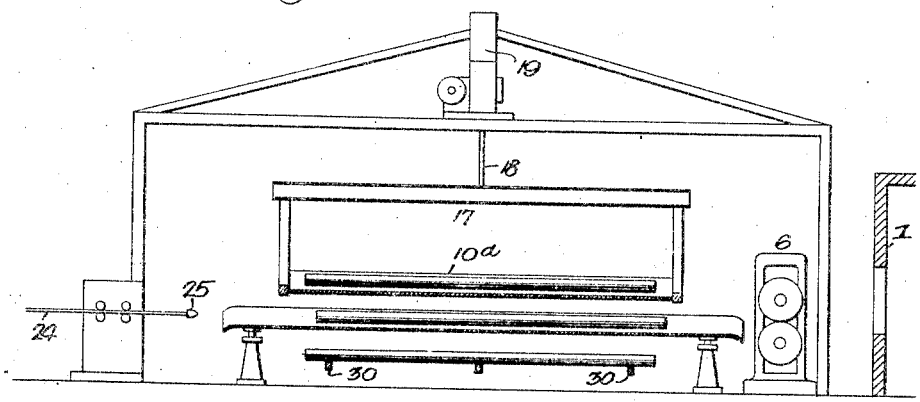
Fig. 3 is a diagrammatic sectional view on the line 3—3, Fig. 1.

24 are the usual mandrel bars on which are the balls 25, Fig. 3. These balls operate in connection with the welding rods 6 to weld the laps of the tube skelp and tubes as they are projected from the furnace. The tubes are transferred from the troughs 8, $8^a$ to their respective charging troughs 10, $10^a$ by any suitable means. In the present instance, I have shown a lever 26 pivoted at 27 to one side of the troughs 8, $8^a$. These levers have arms which lift the tubes out of their troughs and allow them to roll over inclined ways to their respective charging troughs 10, $10^a$. The central trough 9 has a lever 29, which lifts the finished tube out of the trough 9 and allows it to run down the inclined rails 30 to a trough 31 from which it is passed between the sizing rolls 32 and into a trough 33. The sizing rolls are of the ordinary construction.

The operation is as follows:

$a, a'$ represent a series of unwelded lapped tube skelps in position to be introduced into the furnace 1 through the openings 2, $2^a$. $b, b'$ represent two sets of skelps within the furnace being heated, and $c, c'$ represent the skelps, one from each set $b, b'$ being passed through the welding rolls 6, $6^a$. After they pass between the welding rolls and over the balls 25, they rest in the trough 8, $8^a$, respectively. They are then transferred to the recharging troughs 10, $10^a$, which are preferably turned end for end so as to reverse the position of the tubes in the furnace. The tubes are then passed into the furnace through the openings 5, 5ª and are reheated in the position indicated at $d$ on each side of the central opening 4. The tubes are then taken, preferably alternately, from each side and passed through the opening 4 and between the second welding roll 7 and over the ball. The tubes are projected onto the trough 9 and from this trough they are transferred over the rails 30 to the trough 31, between the sizing rods and onto the trough 33.

It will be seen by the above construction that I am enabled to increase the production of a tube welding furnace by charging the furnace with two sets of tube skelps, each of which receives its initial welding through independent sets of welding rolls. The tubes are then passed again into the furnace and are reheated and passed through a common set of welding rolls.

I have found that it requires a greater length of time to heat the tubes initially than it does to reheat to make the second pass. An apparatus of the above described type will materially increase the output of the mill in which it is installed.

I claim:

1. The combination in a furnace, of three sets of welding rolls in front thereof, said furnace having openings in line with the rolls, whereby two sets of tube skelps can be welded by being passed between two sets of rolls and reheated in the furnace and both sets of skelps passed between the third pair of rewelding rolls.

2. The combination of a heating furnace; two welding rolls at one end of the furnace, said furnace having openings in line with the rolls; and troughs beyond each set of rolls; a set of rewelding rolls, the furnace having openings in line with said rewelding rolls and having openings into which the first welded tubes can be passed to be reheated.

3. The combination of a furnace having charging openings at one end; two withdrawal openings at the opposite end spaced apart; charging openings at said end alternating with the withdrawal openings; a pair of welding rolls in front of each withdrawal opening; troughs for receiving the tubes from the rolls as they are welded; and means for transferring the tubes from two of the troughs so that the tubes can reënter the furnace to be rewelded in passing between the finishing welding rolls.

4. The combination in apparatus for welding tubes, of a furnace having charging openings at one end and having, at the opposite end, three withdrawal openings spaced apart and two charging openings, one between the central withdrawal opening and the two side withdrawal openings; two pairs of primary welding rolls in line with two of the withdrawal openings; a rewelding roll in line with the central withdrawal opening; a series of troughs in line with said openings, the troughs in line with the charging openings having means whereby they can be turned end for end, and means for directing the finished tube from the trough in front of the central withdrawal opening.

JAMES H. MATHESON.